Figures 1, 2, 3, 4, 5:
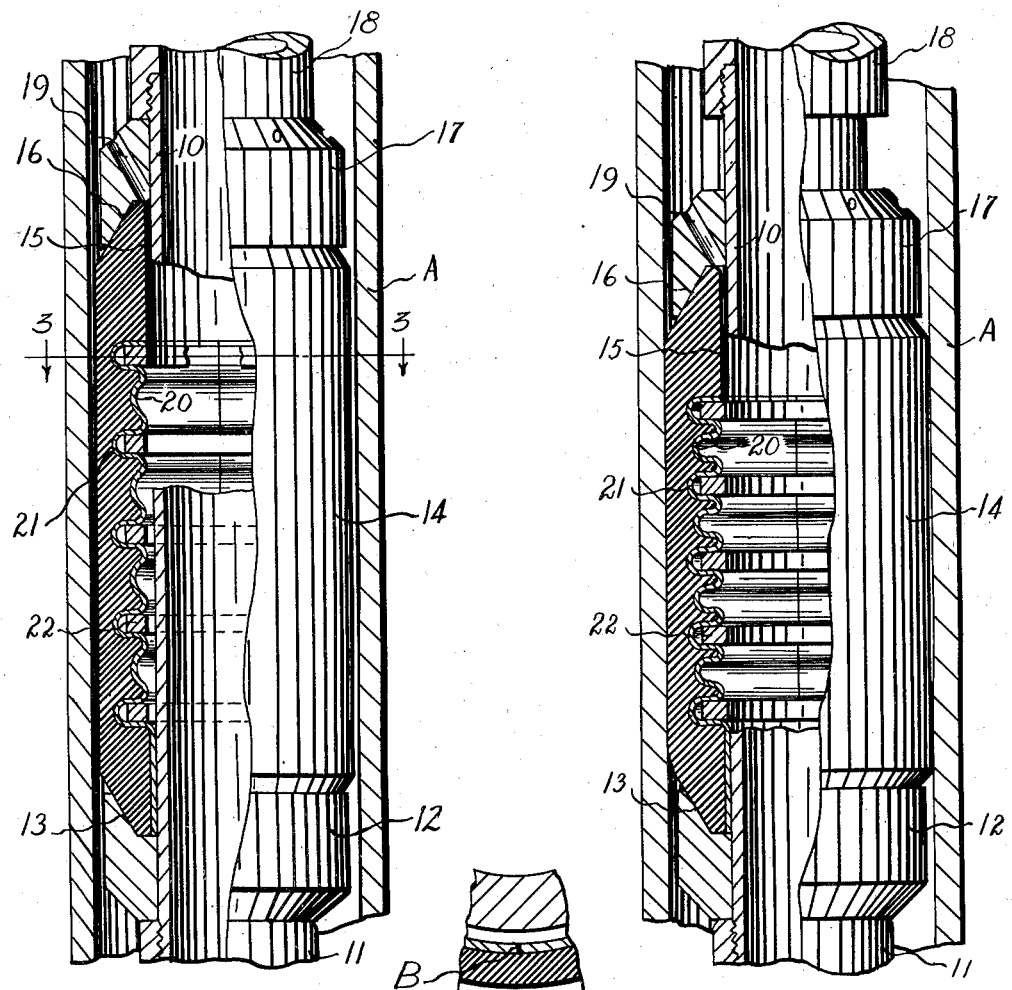

May 31, 1938.   F. A. THAHELD   2,119,252
WELL SWAB
Filed April 4, 1936

Inventor:
FERI A. THAHELD,
By Jack A. Schley
Attorney.

Patented May 31, 1938

2,119,252

UNITED STATES PATENT OFFICE 2,119,252

WELL SWAB

Feri A. Thaheld, Dallas, Tex., assignor to The Guiberson Corporation, Dallas, Tex., a corporation of Delaware Application April 4, 1936, Serial No. 72,747

12 Claims. (Cl. 309—23)

This invention relates to new and useful improvements in well swabs.

One object of the invention is to provide an improved swab having an elongate elastic packing member, which is particularly adapted for use in oil wells.

An important object of the invention is to provide an improved elastic packing member for a well swab which is provided with a corrugated liner for strengthening the packing member, with means for stiffening the liner, whereby the life of the packing member is lengthened and more efficient swabbing may be accomplished.

Another object of the invention is to provide a corrugated liner molded within the elastic packing member of a swab, with metallic rings within the liner for stiffening said liner and also for limiting the distortion of the liner and packing element.

A further object of the invention is to provide an improved corrugated liner or bushing for the packing element of a well swab, which liner is constructed in halves, whereby metal reinforcing rings may be inserted in the corrugations of said liner, after which the halves of the liner may be welded together and the rubber molded therearound.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view, partly in section and partly in elevation, of a swab constructed in accordance with the invention, and showing the packing element disengaged from the well casing, Figure 2 is a similar view, showing the packing element distorted into packing position, Figure 3 is a horizontal, cross-sectional view, taken on the line 3—3 of Figure 1, Figure 4 is an enlarged horizontal cross-sectional view, showing the welded joint between the halves of the liner, and Figure 5 is an isometric view of a portion of one half of the liner.

In the drawing, the numeral 10 designates a tubular mandrel, which has a supporting collar 11 screwed onto its lower end. A thimble 12 having its lower edge resting on the upper end of the collar 11 surrounds the mandrel and is provided with an internal beveled seat 13 at its upper end. The lower conical end of an elastic packing member 14 is inserted within the upper end of the thimble and engages the seat. The packing member surrounds the mandrel and has an axial bore 15 which has a diameter slightly greater than the outside diameter of the mandrel.

The upper end of the packing member 14 is tapered so as to fit within an internal annular beveled recess 16 which is provided in the lower end of a retaining collar 17. The collar 17 surrounds the upper end of the mandrel and is held in engagement with the upper end of the packing member by a coupling collar 18 which is screwed onto the upper end of said mandrel. As is clearly shown in Figures 1 and 2, the coupling collar 18 has its lower edge engaging the upper end of the collar 17. The retaining collar 17 is formed with inclined ports 19 which extend from the upper end of the collar inwardly, and have their lower ends communicating with the space between the inner periphery or bore 15 of the elastic packing member and the outer surface of the mandrel 10. It is obvious that when the swab is lowered within the well casing A, fluid within the casing above said swab can pass through the inclined ports 19 and into the space between the mandrel and the packing element 14, whereby said fluid will serve to expand the packing member, as will be explained.

The annular packing member 14 is constructed of rubber, rubber compound, or other similar material and is comparatively long in length so that when said member is engaging the casing wall, it will provide an increased swabbing or packing area. In order to reinforce the elongate packing member, a corrugated liner or bushing is molded along the inner surface of said member. The liner is formed with corrugations 20 and 21, the corrugations 21 having a greater diameter than the corrugations 20, these corrugations being spaced along the vertical length of said liner. The corrugations 20 are hereinafter referred to as shallow corrugations and the corrugations 21 are hereinafter referred to as the deep corrugations. Inserted within the corrugations 21 are a plurality of solid metal rings 22. Since the liner is located on the inner periphery of the packing member 14, and the rings 22 are inserted in the large corrugations 21, it will be obvious that the mandrel which extends through the entire assembly is surrounded by said liner and said rings.

Although the liner may be constructed in any suitable manner, I prefer to construct the same in two halves, as is clearly shown in Figure 3. The liner is preferably constructed of a resilient metallic material and when the swab is first assembled the solid metal rings 22 are inserted in the enlarged corrugations 21 of the two halves of said liner. After this insertion is made, the two halves are then welded together, as shown at B in Figures 3 and 4, whereby a cylindrical liner or bushing is formed. The packing element 14 is then formed around the reinforced liner or bushing, and thus said liner is molded to the elastic material of which said packing member 14 is constructed. The various parts are then assembled as shown in Figure 1. In operation, the swab is lowered into the well and due to the normal position of the metallic liner or bushing, the packing member 14 is held in its elongated condition, being disengaged from the wall of the casing. This permits the fluid within the well casing A to by-pass the swab as the same is lowered therein.

Upon the upstroke of the swab, that is, when said swab is lifted within the well casing A, the fluid within said casing and above said swab, will enter the ports 19 in the retaining collar 17. This well fluid will then pass downwardly within the space between the bore 15 of the packing member 14 and the outer surface of the mandrel 10. The weight and pressure of this fluid will move the collar 17 downwardly, thereby reducing the length of the packing member 14 and distorting the same so as to cause it to engage the wall of the casing in a plurality of places. It is to be noted that the corrugations 21 are deeper than the corrugations 20 and that the side walls of the deep corrugations 21 cannot be moved toward each other since the ring 21 prevents such action. There will, therefore, be little, if any, expansion or distortion of that part of the packing member 14 which extends outwardly from the corrugations 21. Practically all of the distortion of the packing member 14 curves between the successive corrugations 21 so that, were it not for the casing A, there would be a series of wave like ridges created, forming a plurality of packers, there being as many of such wave like packing ridges as there are spaces between the adjacent deep corrugations 21. The net effect, therefore, of the tendency of the packer to form a series of such packers is that the packer 14, outwardly from the deep corrugations 21, is pressed against the casing A with but little, if any, force, but is pressed against the casing A between succeeding corrugations 21 with great force, thereby forming, in effect, a series of packing rings which performs much the same function as piston rings do in an internal combustion engine. This construction also makes it well nigh impossible to rupture the material of which such packer is made by applying too heavy a pressure or load thereto.

In my former Patent #2,013,902, patented September 10th, 1935, I show in Figures 6 and 9 a corrugated liner associated with a packer. The present application is an improvement on the structure shown in the said patent, for in the said patent, I do not show alternate deep and shallow corrugations, nor do I show any means to prevent a portion of the corrugations from being distorted while permitting the remainder to be distorted.

It is pointed out that although the liner or bushing has been shown and described as constructed in two halves, it may be made in any suitable manner. Also, the number of corrugations in said liner are subject to variation for it is obvious that so long as the liner is constructed so that it may be distorted under pressure, the purposes of the invention are carried out. Although it is desirable that the packing member 14 be elongate so as to provide an increased swabbing or packing area, it would be possible to vary the length of this member and still obtain efficient results. The solid metal rings 22 are important in that they not only reinforce the metallic liner or bushing, but also limit the distortion of said bushing to prevent rupturing or damage of the packing member 14 due to excessive pressure.

What I claim and desire to secure by Letters Patent, is:

1. A well swab including, a support adapted to be lowered in a well casing, an elastic packing member mounted on the support, means engaging the upper end of the member and adapted to be subjected to the well fluid thereabove for distorting the member into engagement with the well casing, means capable of longitudinal distortion reinforcing the member, and means limiting the longitudinal distortion of said reinforcing means.

2. A well swab including, a support, an elastic packing member mounted on the support, a resilient corrugated liner on the inner periphery of the member reinforcing said member, and a plurality of solid rings inserted in corrugations of said liner stiffening the same.

3. A well swab including, a support, an elastic packing member mounted on the support, a resilient corrugated liner on the inner periphery of the member reinforcing said member, and a plurality of solid rings inserted in corrugations of said liner stiffening the same, said rings also limiting the distortion of said liner and packing member.

4. A well swab including, a support adapted to be lowered in a well casing, an annular thimble on said support, an elastic packing member surrounding the support and having its lower end within said thimble, a retaining collar engaging the upper end of the packing member and slidable on the support, said retaining collar being adapted to be exposed to the well fluid in the casing above the packing member, whereby the pressure and weight of said fluid depresses the collar to distort the packing member, resilient means capable of longitudinal distortion reinforcing the member, and means limiting the longitudinal distortion of said reinforcing means.

5. A well swab including, a support adapted to be lowered in a well casing, an annular thimble on said support, an elastic packing member surrounding the support and having its lower end within said thimble, a retaining collar engaging the upper end of the packing member and slidable on the support, said retaining collar being adapted to be exposed to the well fluid in the casing above the packing member, whereby the pressure and weight of said fluid depresses the collar to distort the packing member, the collar having fluid passages extending therethrough to establish communication between the well casing and the bore of the packing member, resilient means capable of longitudinal distortion reinforcing the member, and means limiting the longitudinal distortion of said reinforcing means.

6. A well swab including, a support adapted to be lowered in a well casing, an annular thimble on said support, an elastic packing member surrounding the support and having its lower end within said thimble, a retaining collar engaging the upper end of the packing member and slidable on the support, said retaining collar being adapted to be exposed to the well fluid in the casing above the packing member, whereby the pressure and weight of said fluid depresses the collar to distort the packing member, a metallic bushing capable of longitudinal distortion reinforcing said member, and means limiting the longitudinal distortion of said reinforcing bushing.

7. A well swab including, a support adapted to be lowered in a well casing, an annular thimble on said support, an elastic packing member surrounding the support and having its lower end within said thimble, a retaining collar engaging the upper end of the packing member and slidable on the support, said retaining collar being adapted to be exposed to the well fluid in the casing above the packing member, whereby the pressure and weight of said fluid depresses the collar to distort the packing member, a resilient corrugated liner on the inner periphery of the member reinforcing said member, and a plurality of solid rings inserted in corrugations of said liner stiffening the same.

8. A well swab for use in a well casing including, a support, an elastic packing member on said support, a resilient corrugated liner on the inner periphery of the member, said liner being provided with alternate deep and shallow corrugations and means to prevent the movement of the sides of the deep corrugations towards each other.

9. A well swab including, a circular liner provided with alternate deep and shallow corrugations, an elastic packing member on the outer periphery of said liner and means to prevent the distortion of certain of said corrugations.

10. A well swab including a circular liner provided with alternate deep and shallow corrugations, an elastic packing member on the outer periphery of said liner and a plurality of solid rings inserted within certain of said corrugations.

11. A well swab including a circular liner provided with alternate deep and shallow corrugations, an elastic packing member on the outer periphery of said liner and a plurality of solid rings inserted within the deep corrugations.

12. A contractible and extensible liner provided with alternate deep and shallow corrugations and a ring placed in each deep corrugation to hold the sides thereof against movement towards each other.

FERI A. THAHELD.